United States Patent
Taylor et al.

(10) Patent No.: US 7,640,295 B2
(45) Date of Patent: Dec. 29, 2009

(54) METHODS AND APPARATUS FOR MANAGING DATA FLOW WITHIN A NETWORK

(75) Inventors: Robert Taylor, Washougal, WA (US); James Walker, Austin, TX (US); Daniel Slightam, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1139 days.

(21) Appl. No.: 11/005,177

(22) Filed: Dec. 4, 2004

(65) Prior Publication Data

US 2006/0120349 A1 Jun. 8, 2006

(51) Int. Cl.
*G06F 15/16* (2006.01)

(52) U.S. Cl. ............... 709/203; 709/222; 709/228; 709/229; 709/230; 358/1.15; 358/474

(58) Field of Classification Search ........... 709/203, 709/222, 228, 229, 230; 358/1.15, 474
See application file for complete search history.

(56) References Cited

U.S. PATENT DOCUMENTS

| | | | |
|---|---|---|---|
| 5,450,571 A | 9/1995 | Rosekrans et al. | |
| 6,173,295 B1 | 1/2001 | Goertz et al. | |
| 6,335,795 B1 | 1/2002 | Neuhard et al. | |
| 6,476,927 B1 | 11/2002 | Schwarz, Jr. | |
| 6,498,656 B1 | 12/2002 | Mastie et al. | |
| 7,133,166 B2 * | 11/2006 | Ferlitsch et al. | 358/474 |
| 7,301,663 B2 * | 11/2007 | Ferlitsch | 358/1.15 |
| 7,327,482 B2 * | 2/2008 | Ferlitsch | 358/1.15 |

* cited by examiner

*Primary Examiner*—Jinsong Hu (57) ABSTRACT

Systems and methods are directed to managing resources within a network. In one example a method includes receiving destination capabilities from at least one destination component to an intermediate services component and generating an aggregate capabilities ticket based on the received destination capabilities. The method further includes providing the generated aggregate capabilities ticket from the intermediate services component to a client component and receiving an aggregate intent ticket that is produced by the client component and based on the aggregate capabilities ticket to the intermediate services component from the client component. The method may further include compiling a destination component database. The method may additionally include generating a destination intent ticket based on the received aggregate intent ticket and the destination component database, and providing the destination intent ticket to a target destination component.

28 Claims, 4 Drawing Sheets

METHODS AND APPARATUS FOR MANAGING DATA FLOW WITHIN A NETWORK

BACKGROUND

In modern service-based systems, there are frequently many (often thousands) of destinations that may implement a given task. However, each destination may have different capabilities and constraints or limitations with respect to the task. If a client is familiar with a destination, the client can use this information to guide the configuration and invocation of the task. If, though, the client has not chosen the destination at the time of a job invocation (e.g. likely the case if a service is intermediating between the client and the destination), the client does not have a way to understand how to configure the task. Typically, it is not reasonable for the client to know the capabilities of each potential individual destination, as there could possibly be thousands of potential destinations.

One conventional solution to this issue includes limiting the system functionality to a "least common denominator" feature set. Unfortunately, this solution limits the client's access to the full capabilities of the eventual target destination. Another conventional solution to this issue includes forcing the client to limit the destination choice to a single destination as the client's target. Unfortunately, this solution either limits the client's options (e.g. it is only exposed to the capabilities of a single target) or requires the client to repeatedly query individual destinations for their capabilities. This solution has the potentially undesirable consequence of consuming an excessive amount of time or possessing inordinate complexity.

It would be desirable therefore, to provide advancements to the art that overcome these and other disadvantages.

SUMMARY

According to an embodiment of the present invention, a method is directed to managing resources within a network. The method includes receiving destination capabilities from at least one destination component to an intermediate services component, compiling a destination component database, and generating an aggregate capabilities ticket based on the received destination capabilities. The method additionally includes providing the generated aggregate capabilities ticket from the intermediate services component to a client component and receiving an aggregate intent ticket that is produced by the client component and based on the aggregate capabilities ticket to the intermediate services component from the client component. The method further includes generating a destination intent ticket based on the received aggregate intent ticket and the destination component database, and providing the destination intent ticket to a target destination component.

According to another embodiment, a method is directed to generating a job ticket within a network that includes processing received destination capabilities at an intermediate services component to produce an aggregate capabilities ticket, processing a received aggregate intent ticket that is produced by the client component and based on the aggregate capabilities ticket and a job at the intermediate services component to identify a target destination, and providing a destination intent ticket based on the aggregate intent ticket and defining a job associated with the job ticket to the target destination.

According to still another embodiment, a network configured to provide resource management includes a communication bus, at least one client device, at least one destination device, at least one processor, and at least one computer readable memory device that is readable by the processor. The computer readable memory device contains a series of computer executable steps configured to cause the processor to receive destination capabilities from at least one destination device to an intermediate services component, to compile a destination device database, to generate an aggregate capabilities ticket based on the received destination capabilities, to provide the generated aggregate capabilities ticket from the intermediate services component to a client device, to receive an aggregate intent ticket that is produced by the client device based on the aggregate capabilities ticket to the intermediate services component from the client device, to generate a destination intent ticket based on the received aggregate intent ticket and the destination device database, and, finally to provide the destination intent ticket to a target destination device.

The foregoing and other features and advantages of the invention will become further apparent from the following detailed description of the presently preferred embodiments read in conjunction with the accompanying drawings.

DETAILED DESCRIPTION

Non-limiting embodiments of the present invention provide for methods and systems for managing data flow within a networked resource management system. A "job ticket" is a tool used in various systems to undertake and complete a project, such as, for example the steps undertaken to print a document file.

Figure 1:
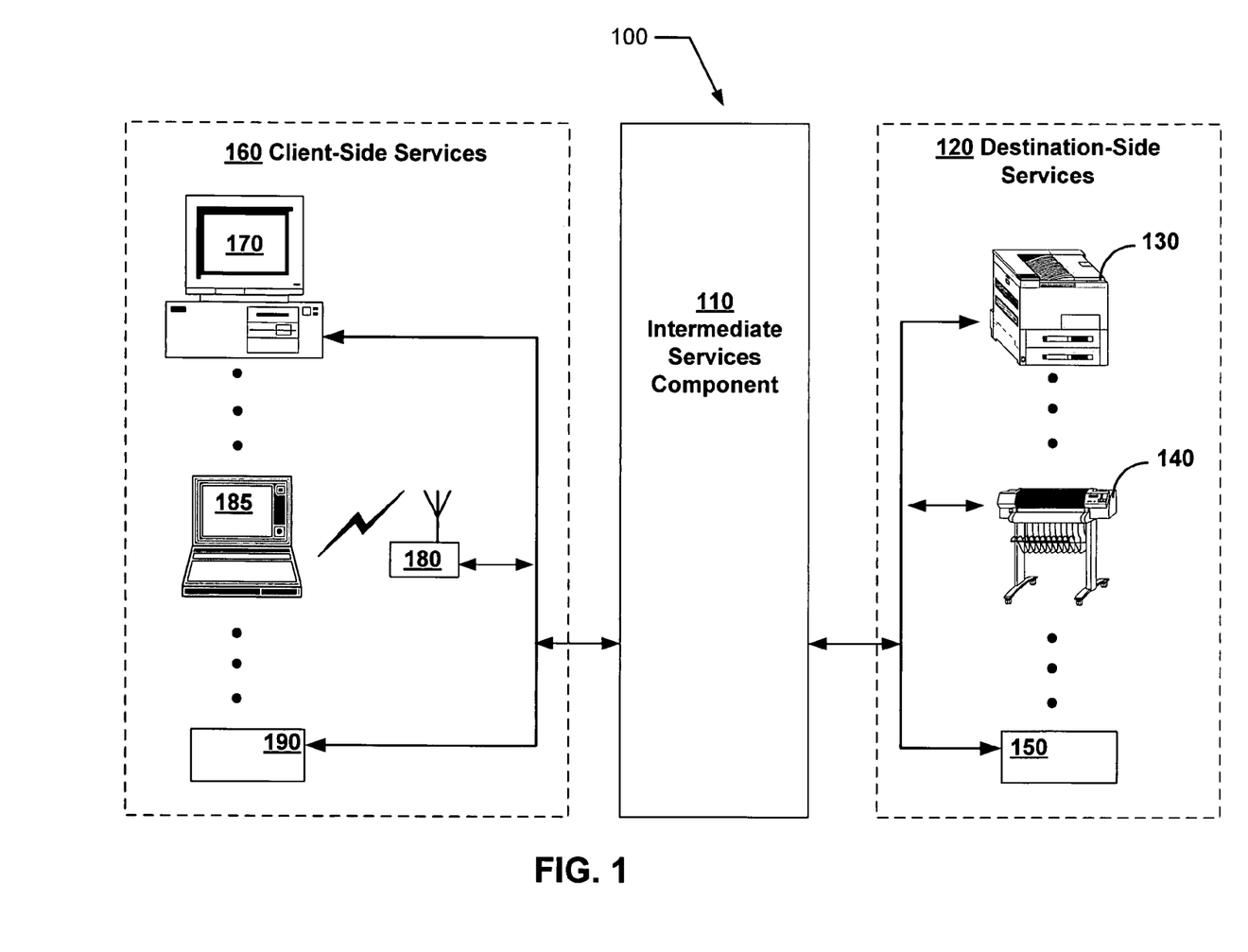
FIG. 1 illustrates a networked resource management system in an exemplary operating environment, in accordance one embodiment of the present invention.

FIG. 1 illustrates a networked resource management system in an exemplary operating environment. FIG. 1 illustrates a networked resource management system 100 for managing data flow within a network. Networked resource management system 100 includes intermediate services component 110, destination-side services 120, and client-side services 160. Destination-side services 120 further includes a printer 130, a plotter 140, and additional destination-side services component 150. Client-side services 160 includes a personal computer (PC) 170, a wireless hub 180 in wireless communication with a laptop computer 185, and additional client-side services component 190. Networked resource management system 100 is a distributed node network wherein every component within the network is an addressable device attached to the network.

Intermediate services component 110 is coupled to destination-side services 120 and client-side services 160, and performs capabilities aggregation functions and routing functions for resource management system 100. In one embodiment, a server computer (not specifically shown) having intermediate services software implements the functions of intermediate services component 110. In this embodiment, the server computer (not specifically shown) having intermediate services software includes a communications bus, at least one processor, a computer readable memory device which is readable by the processor, and other such components as are necessary to provide intermediate services component functionality. In another embodiment, the capabilities and functions of intermediate services component 110 are distributed among one or more connected devices (not shown). In another embodiment, the capabilities and functions of intermediate services component 110 are performed by the individual components within client-side services 160.

Destination-side services 120 is coupled to intermediate services component 110, provides service capabilities information to intermediate services component 110, and receives and executes job requests from intermediate services component 110. Destination side components are devices having features and options that provide specified services, such as, for example printing, plotting, data file management, data storage, scanning, computing services, such as, a server computer, personal computers, and the like.

Printer 130 is any communication-enabled printing device configured for rendering images and documents, such as proof images, from data files onto tangible media, such as, for example, paper sheet stock. In one embodiment, printer 130 is a multi-function printer-scanner device enabled to operate as a document copying and sending device as well as a printing device. In another embodiment (not shown), printer 130 includes a processor and memory components.

Plotter 140 is any communication-enabled plotting device configured for rendering images from data files onto tangible media, such as, for example, paper sheet stock. In one embodiment (not shown), plotter 140 includes a processor and memory components.

Additional destination-side services component 150 is any other destination-side services component, such as, for example a scanner, a computing services component, an email server, a web hosting component, a fileserver, a document management system, a facsimile (fax) machine, and the like. In one embodiment (not shown), additional destination-side services component 150 includes a processor and memory components to provide data file management or data storage, among numerous other functions. Although destination-side services component 150 is illustrated as a destination component in FIG. 1, in another embodiment (not shown) destination-side services component 150 is coupled to other destination-side services components and functions as an intermediate services component that is independently addressable.

In an example, an email server is a server computer capable of executing one or more computer programs that provide email services. In another example, a web hosting component is one or more computer programs configured to provide web hosting services when executed by a computer, such as, a server. In yet another example, a fileserver is a server computer capable of executing one or more computer programs that provide file management. In another example, a document management system is a server computer and associated hardware components capable of executing one or more computer programs that provide document management.

Client-side services 160 is coupled to intermediate services component 110, receives aggregated capabilities information from intermediate services component 110, and provides aggregated intent information to intermediate services component 110. Client-side services 160 includes client devices/components (described below) that provide a user interface presenting various features and options for implementation.

Personal computer (PC) 170 is any PC or laptop that is a communication-enabled computer system having a memory component and a processor (not shown). In one embodiment, the memory component includes programs and data (not shown) such as, for example, an operating system, as will be known to those skilled in the art. In another embodiment (not shown), the memory component includes data such as that stored to memory device, that is, programs to practice the client-side services portion of the invention. The skilled practitioner will recognize that in some implementations personal computer 170 includes other components not relevant to the present discussion and therefore do not require elaboration.

Wireless hub 180 is any wireless communication-enabled hub including the requisite components to provide wireless coupling of laptop computer 185 to a network incorporating intermediate services component 110. Laptop computer 185 is any laptop or personal computer that is a wireless communication-enabled computer system having a memory component and a processor (not shown). In one embodiment, the memory component includes programs and data (not shown) such as, for example, an operating system, as will be known to those skilled in the art. In another embodiment (not shown), the memory component includes data such as that stored to memory device, that is, programs to practice the client-side services portion of the invention. The skilled practitioner will recognize that in some implementations laptop computer 185 includes other components not relevant to the present discussion, and therefore do not require elaboration.

Additional client-side services component 190 is any other client-side services component, such as a network node coupled to an associated network, a scanner, a facsimile machine, a database including data files containing images, template data and send job data, and the like. In one embodiment (not shown), additional client-side services component 190 includes a processor and memory components to provide data file management or data storage, among numerous other functions.

In operation, intermediate services component 110 receives capabilities information from destination-side services 120 and provides aggregated capabilities information to client-side services 160. In one embodiment, the destination capabilities information is provided as a destination capabilities ticket that declares capabilities sets that define the scope of the implementation of a given service. In this embodiment, the aggregated capabilities information is provided as an aggregated capabilities ticket that declares aggregated capabilities sets that define the scope of the implementation of the provided destination-side services. Client-side services 160 receives the aggregated capabilities information from intermediate services component 110 and provides aggregated intent information to intermediate services component 110. In one embodiment, the aggregated intent information is provided as an aggregated intent ticket that declares specific intended features of each destination-side service that is to be executed. Intermediate services component 110 receives the aggregated intent information from client-side services 160 and provides destination intent information to destination-side services 120. In one embodiment, the destination intent information is provided as a destination intent ticket that declares specific intended features of a particular destination-side service that is to be executed.

Figure 2:
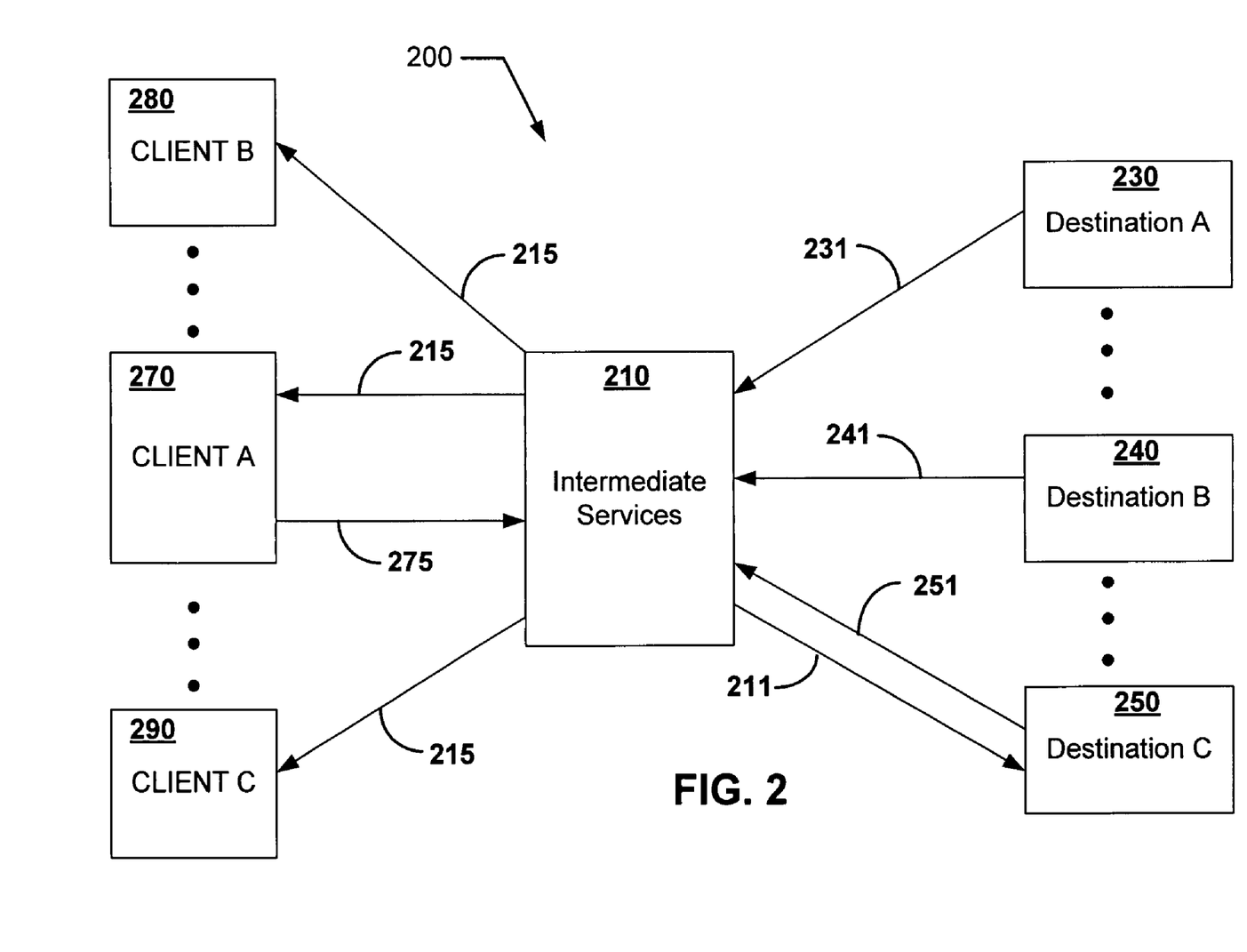
FIG. 2 is a block diagram illustrating data flow within the networked resource management system of FIG. 1, in accordance with another embodiment of the present invention.

FIG. 2 is a block diagram illustrating one embodiment of data flow within the networked resource management system of FIG. 1. FIG. 2 illustrates networked resource management system 200 for managing data flow within a network. Networked resource management system 200 includes intermediate services component 210, destination "A" 230, destination "B" 240, destination "C" 250, CLIENT A 270, CLIENT B 280, and CLIENT C 290.

Intermediate services 210 represents software operational within one or more devices, such as, for example intermediate services component 110 as described in FIG. 1, above. Intermediate services component 210 is coupled to, and in communication with, destination A 230, destination B 240, and destination C 250, as well as CLIENT A 270, CLIENT B 280, and CLIENT C 290. In operation, intermediate services 210 receives destination capabilities tickets (231, 241, and 251) from destination A 230, destination B 240, and destination C 250, and produces aggregate capabilities ticket 215 that is provided to CLIENT A 270, CLIENT B 280, and CLIENT C 290. In the embodiment illustrated in FIG. 2, CLIENT A 270 receives aggregate capabilities ticket 215 and produces aggregate intent ticket 275 that is provided to intermediate services 210. In this embodiment, intermediate services 210 receives aggregate intent ticket 275 and produces destination intent ticket 211.

Destination A 230 represents software operational within a destination-side component. In an example, and referring to FIG. 1, destination A 230 represents software operational within printer 130. Destination A 230 produces destination capabilities ticket 231 that includes capabilities that the device can perform, such as, for example, parameters inside which the device functions.

Destination B 240 represents software operational within a destination-side component. In an example, and referring to FIG. 1, destination B 240 represents software operational within plotter 140. Destination B 240 produces destination capabilities ticket 241 that includes capabilities that the device can perform, such as, for example, parameters inside which the device functions.

Destination C 250 represents software operational within a destination-side component. In an example, and referring to FIG. 1, destination C 250 represents software operational within additional destination-side services component 150. Destination C 250 produces destination capabilities ticket 251 that includes capabilities that the device can perform, such as, for example, parameters inside which the device functions.

In one embodiment, the destination capabilities tickets (231, 241, and 251) declare a specific range of operation of a particular instantiation. That is, the destination software, through the use of the destination capabilities ticket, declares specific intent parameters the destination software supports for a given service or task instantiation, and the ranges and/or enumerations the destination software supports for each parameter. In this embodiment, each capabilities ticket defines the features of an associated destination relative to a set of tasks that the destination is capable of performing. In an example, the capabilities ticket defines the features each task is capable of executing, the options/ranges for each feature the task supports, the method(s) for invoking the feature the task supports, the data necessary to create a user interface (UI) allowing configuration of a job associated with the instantiation, constraints defining feature/option combinations that are not allowed (e.g. stapled transparences), and macros allowing selection of a particular feature/option that triggers the state of features/options.

In operation, the production by intermediate services 210 of aggregate capabilities ticket 215 based on destination capabilities tickets (231, 241, and 251) includes parsing destination capabilities information included within destination capabilities tickets (231, 241, and 251) to obtain a feature set describing selected features available from destination A 230, destination B 240, and destination C 250, and excluding duplicate features. The production of aggregate capabilities ticket 215 additionally includes determining at least one option associated with the features of the feature set, and merging the option(s) associated with the features to produce an options set. The production of aggregate capabilities ticket 215 further includes merging the feature set and the options set to produce aggregate capabilities ticket 215.

CLIENT A 270 represents software operational within a client-side component. In an example, and referring to FIG. 1, CLIENT A 270 represents software operational within personal computer 170. In one embodiment illustrated in FIG. 2, CLIENT A 270 receives aggregate capabilities ticket 215 from intermediate services 210, and produces aggregate intent ticket 275 based on user input from a user interface (not shown) that includes a set of one or more process definitions that are intended to be executed.

CLIENT B 280 represents software operational within a client-side component. In an example, and referring to FIG. 1, CLIENT B 280 represents software operational within laptop computer 185. CLIENT B 280 receives aggregate capabilities ticket 215 from intermediate services 210. In one embodiment, CLIENT B 280 produces an aggregate intent ticket (not shown) based on user input from a user interface (not shown) that includes a set of one or more process definitions that are intended to be executed.

CLIENT C 290 represents software operational within a client-side component. In an example, and referring to FIG. 1, CLIENT C 290 represents software operational within additional client-side services component 190. CLIENT C 290 receives aggregate capabilities ticket 215 from intermediate services 210. In one embodiment, CLIENT C 290 produces an aggregate intent ticket (not shown) based on user input from a user interface (not shown) that includes a set of one or more process definitions that are intended to be executed.

In one embodiment, the intent capabilities ticket(s) 275 are full process descriptions that define the instantiation of one or more processes. In an example, the intent capabilities ticket (s) 275 are full process descriptions that define the instantiation of one or more processes that include a group of information sets that define the attributes of the processes. In another embodiment, the intent capabilities ticket(s) 275 are a group of information sets that define the attributes of an externally defined process.

In operation, the production by intermediate services 210 of destination intent ticket 211 based on aggregate intent ticket 275 does not explicitly require a one-to-one binding between intent processes and destination services. That is, multiple intent processes can be solved by a single destination-side component and a single intent process can be satisfied by a set of destination-side components. In one embodiment, the binding of intent processes to destination-side components is conducted by intermediate services 210. In this embodiment, intermediate services 210 distributes the jobs to any combination of destination-side components so long as the requirement of the intent ticket are fulfilled. In another embodiment, the user, through a client-side component having a user interface (UI), specifies explicitly the identity of the destination-side component. In this embodiment, intermediate services 210 considers this a requirement and will not utilize a different destination-side component without negotiation with the user via the UI of the client-side component.

Figure 3:
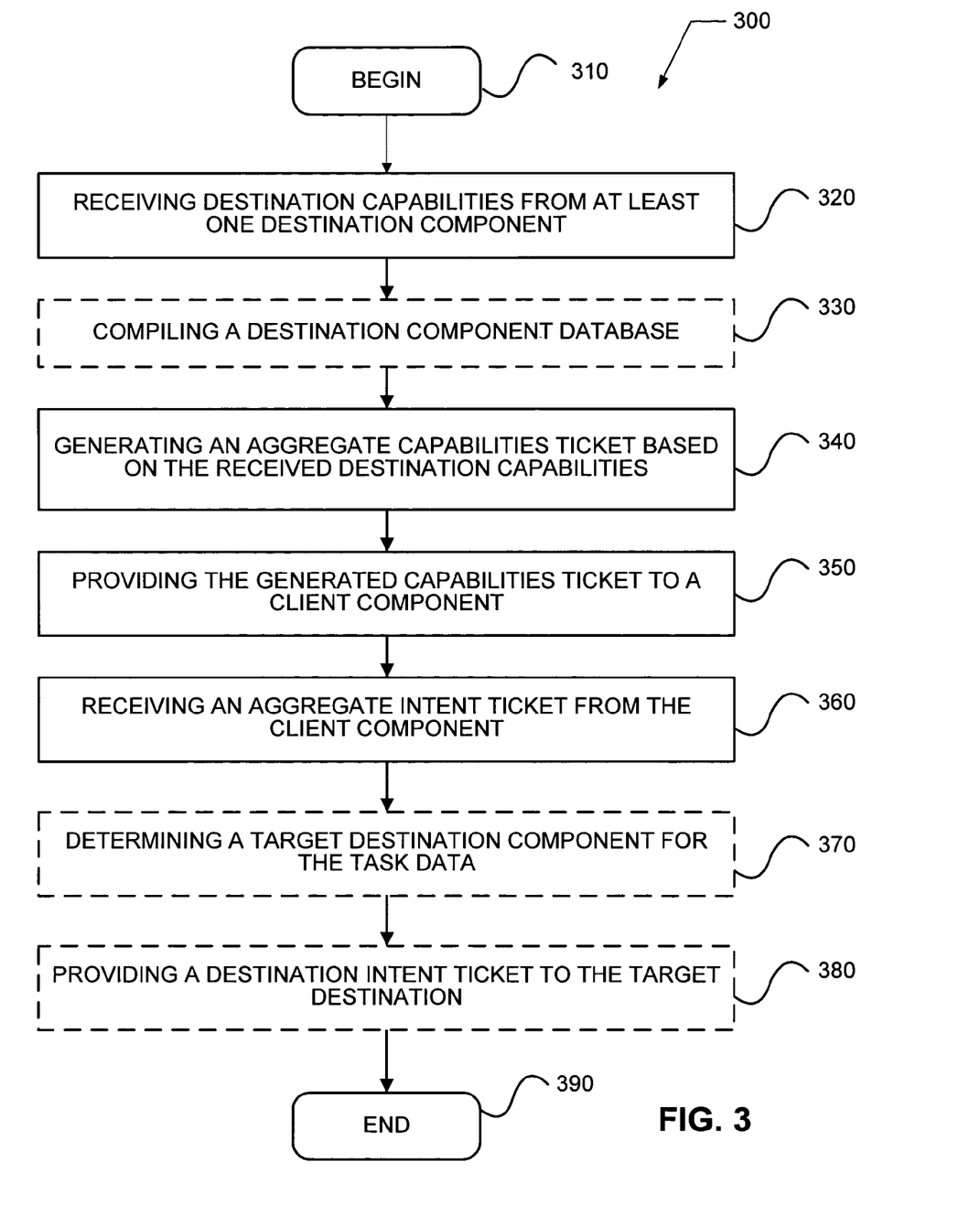
FIG. 3 is a flow diagram depicting a method of managing resources within a network, in accordance with one embodiment of the present invention.

FIG. 3 is a flow diagram depicting a method 300, in accordance with one embodiment of the present invention. FIG. 3 illustrates a method 300 of managing resources within a network. In one embodiment, method 300 is implemented with components of the exemplary operating environment of FIG. 1 and illustrative data flow of FIG. 2. In another embodiment, one or more steps of method 300 are embodied in a computer readable medium containing computer readable code such that a series of steps are implemented when the computer readable code is executed on a computing device. Method 300 begins in step 310. In some implementations, certain steps of method 300 are combined, performed simultaneously or in a different order, without deviating from the objective of method 300 or producing different results.

At step 320, destination capabilities are received to an intermediate services component from at least one destination component. In one embodiment, and referring to FIG. 1 above, the destination capabilities is destination capabilities information describing features and options of the destination-side components. In another embodiment, destination capabilities information is provided as a destination capabilities ticket that declares capabilities sets that define the scope of the implementation of a given service (e.g. features and options). In an example, and referring to FIG. 2 above, destination capabilities, in the form of destination capabilities tickets (231, 241, and 251), are received to intermediate services component 210 from destination A 230, destination B 240, and destination C 250. In another embodiment, receiving destination capabilities from at least one destination component to an intermediate services component includes polling at least one destination component for the destination capabilities with the intermediate services component, and communicating with the at least one destination component when the at least one destination component is operational and possesses at least one destination capabilities.

At optional step 330, a destination component database is compiled. In one embodiment, the destination component database includes selected destination components that provide destination capabilities. In another embodiment, the destination component database is an instance of the destination component database class.

At step 340, an aggregate capabilities ticket is generated based on the received destination capabilities. In one embodiment, and referring to FIG. 1 above, the aggregate capabilities ticket declares aggregated capabilities sets that define the scope of the implementation of the provided destination-side services. In an example, the aggregate capabilities ticket includes selected features and selected options of the destination components. In another embodiment, the aggregate capabilities ticket is generated by parsing the received destination information to obtain a feature set describing selected features available from the destination components and excluding duplicate features, determining at least one option associated with the features of the feature set, merging the options associated with the feature set to produce an options set, and merging the feature set and the options set. In this embodiment, the aggregate capabilities ticket generation further includes parsing the received destination information to obtain a limitation set describing features not supported by the destination components, and merging the limitation set with the aggregate capabilities ticket to remove the determined unsupported features and options when the unsupported features and options are not duplicated within the aggregate capabilities ticket. In another embodiment, the aggregate capabilities ticket generation further includes identifying unsupported features and unsupported options within the aggregate capabilities ticket, producing a constraint set based on the identified unsupported features and unsupported options, and merging the constraint set with the feature set and the options set to flag the unsupported features and unsupported options within the aggregate capabilities ticket. In this embodiment, unsupported features and unsupported options are feature and option combinations that destination side components (e.g. destination side components 120 of FIG. 1, above) are unable to execute.

At step 350, the generated aggregate capabilities ticket is provided from the intermediate services component to a client component. In one embodiment, and referring to FIG. 1 above, the generated aggregate capabilities ticket is provided from the intermediate services component to client-side services. In an example, and referring to FIG. 2 above, aggregate capabilities ticket 215 is provided from intermediate services 210 to CLIENT A 270.

At step 360, an aggregate intent ticket is received by the intermediate services component from the client component. The aggregate intent ticket is produced by the client component based on the aggregate capabilities ticket. In one embodiment, the aggregate capabilities ticket includes a task configuration element and task data. In an example, the task configuration element includes features and options selected by the client component. In another embodiment, and referring to FIG. 1, the aggregated intent ticket includes specific intended features of each destination-side service that is to be executed. In an example, and referring to FIG. 2 above, intent capabilities ticket 275 is provided from CLIENT A 270 to intermediate services 210.

At optional step 370, a destination intent ticket is generated based on the aggregate intent ticket. In one embodiment, and referring to FIG. 1 above, the destination intent ticket declares specific intended features of a particular component within destination-side service 120 that is to be executed. In another embodiment, the destination intent ticket includes a target destination component and task data. In this embodiment, the target destination component is determined based on the task configuration element of the received aggregate intent ticket. In another embodiment, the target destination component is determined based on the task configuration element of the received aggregate intent ticket and the destination component database. In an example, and referring to FIG. 1 above, a single destination component from destination-side services 120 is determined based on the task configuration element of the received aggregate intent ticket and the destination component database. In another example, multiple destination components from destination-side services 120 are determined based on the task configuration element of the received aggregate intent ticket and the destination component database.

In another embodiment, the destination intent ticket is generated by removing destination components from the destination component database that do not support the features of the task configuration element of the aggregate intent ticket, removing destination components from the destination component database that do not support the options of the task configuration element of the aggregate intent ticket, polling the remaining destination components of the destination component database for unsupported features and unsupported options, removing the destination components from the destination component database that include a unsupported feature or an unsupported option, and selecting the target destination from the remaining destination components of the destination component database.

Further, in yet another embodiment, method 300 includes the steps of an intermediate services component (e.g. intermediate services component 110 of FIG. 1, above) determining one or more tasks the intermediate services component is capable of executing, merging the one or more tasks that the intermediate services component is capable of executing into the generated aggregate capabilities ticket, executing one or more tasks that the intermediate services component is capable of executing that are within the destination intent ticket, and removing the executed tasks from the aggregate intent ticket.

At optional step 380, the destination intent ticket is provided to a target destination component. In one embodiment, and referring to FIG. 1 above, the generated destination intent ticket is provided from the intermediate services component to the particular destination-side services component. In an example, and referring to FIG. 2 above, destination intent ticket 275 is provided from intermediate services 210 to destination C 250.

At step 390, method 300 ends.

Figure 4:
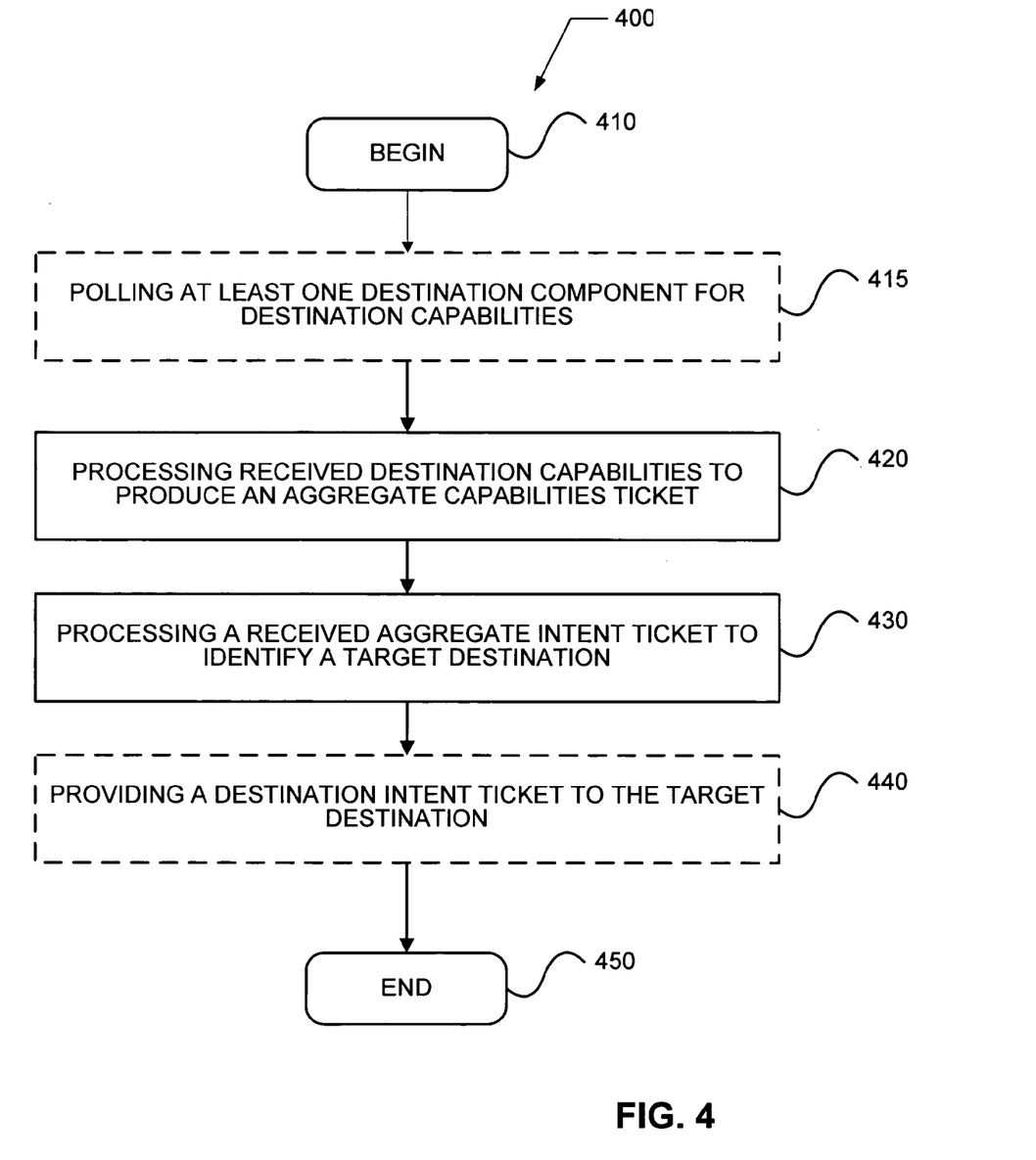
FIG. 4 is a flow diagram depicting a method of generating a job ticket within a network, in accordance with another embodiment of the present invention.

FIG. 4 is a flow diagram depicting a method 400, in accordance with another embodiment of the present invention. FIG. 4 illustrates a method 400 of managing a job ticket within a network. In one embodiment, the job ticket is a print job ticket. In other embodiments the job ticket is any other job ticket that method 400 and its exemplary embodiment, such as, FIGS. 1 and 2, are capable of managing, for example, digital send jobs, data file management, data storage and manipulation, and the like. In one embodiment, method 400 is implemented with components of the exemplary operating environment of FIG. 1 and illustrative data flow of FIG. 2. In another embodiment, one or more steps of method 400 are embodied in a computer readable medium containing computer readable code such that a series of steps are implemented when the computer readable code is executed on a computing device. Method 400 begins in step 410. In some implementations, certain steps of method 400 are combined, performed simultaneously or in a different order, without deviating from the objective of method 400 or producing different results.

At step 420, received destination capabilities are processed at an intermediate services component to produce an aggregate capabilities ticket. In one embodiment, the destination capabilities describe features and options of at least one destination component. In this embodiment, the aggregate capabilities ticket includes selected features and selected options of the destination components. In another embodiment, processing the received destination capabilities at the intermediate services component to produce the aggregate capabilities ticket includes parsing the received destination information to obtain a feature set describing features available from the destination components and excluding duplicate features, determining at least one option associated with the features of the feature set, merging the options associated with the feature set to produce an options set, and merging the feature set and the options set to produce the aggregate capabilities ticket.

In this embodiment, processing the received destination capabilities at the intermediate services component to produce the aggregate capabilities ticket can further include parsing the received destination information to obtain a limitation set describing features not supported by the destination components and merging the limitation set with the aggregate capabilities ticket to remove the determined unsupported features and options when the unsupported features and options are not duplicated within the aggregate capabilities ticket. In another embodiment, processing the received destination capabilities at the intermediate services component to produce the aggregate capabilities ticket further includes identifying unsupported features and unsupported options within the aggregate capabilities ticket, producing a constraint set based on the identified unsupported features and unsupported options, and merging the constraint set with the feature set and the options set to flag the unsupported features and unsupported options within the aggregate capabilities ticket.

In another embodiment, processing received destination capabilities at an intermediate services component includes compiling a destination component database including selected destination components that provide destination capabilities.

At step 430, a received aggregate intent ticket is processed at the intermediate services component to identify a target destination. The aggregate intent ticket is produced by the client component, and based on the aggregate capabilities ticket and a job. In one embodiment, the aggregate intent ticket includes a task configuration element and task data. In another embodiment, processing the received aggregate intent ticket at the intermediate services component to identify a target destination includes removing destination components from the aggregate capabilities ticket that do not support the features of the task configuration element of the aggregate intent ticket, removing destination components from the aggregate capabilities ticket that do not support the options of the task configuration element of the aggregate intent ticket, polling the remaining destination components of the aggregate capabilities ticket for unsupported features and unsupported options, removing destination components from the aggregate capabilities ticket that include a unsupported feature or a unsupported option, and selecting the target destination from the remaining destination components of the aggregate capabilities ticket.

In another embodiment, processing the received aggregate intent ticket at the intermediate services component to identify a target destination includes removing destination components from the destination component database that do not support the features of the task configuration element of the aggregate intent ticket, removing destination components from the destination component database that do not support the options of the task configuration element of the aggregate intent ticket, polling the remaining destination components of the destination component database for unsupported features and unsupported options, removing destination components from the destination component database that include a unsupported feature or a unsupported option, and selecting the target destination from the remaining destination components of the destination component database. In an example, the destination component database is an instance of the destination component database class.

Further, in yet another embodiment, method 400 includes the steps of an intermediate services component (e.g. intermediate services component 110 of FIG. 1, above) determining one or more jobs the intermediate services component is capable of executing, merging the one or more jobs that the intermediate services component is capable of executing into the generated aggregate capabilities ticket, executing one or more jobs that the intermediate services component is capable of executing that are within the destination intent ticket, and removing the executed jobs from the aggregate intent ticket.

At optional step 440, a destination intent ticket is provided to the target destination. The destination intent ticket is based on the aggregate intent ticket and defines a job associated with the job ticket. In one embodiment, the destination intent ticket includes task data and a task configuration element.

At step 450, method 400 ends.

Method 400 can additionally include optional step 415. At optional step 415, at least one destination component is polled with the intermediate services component for the destination capabilities. In another embodiment, the destination components are in regular or constant communication with the intermediate services component, whereby polling is not required.

It is anticipated that the invention will be embodied in other specific forms, not specifically described, that do not depart from its spirit or essential characteristics. The described embodiments are to be considered in all respects only as illustrative and not restrictive, the scope of the invention being defined by the appended claims and equivalents thereof.

What is claimed is:

1. A method of managing resources within a network, the method implemented as computer-readable instructions stored on a computer-readable hardware medium and executable on a processor, comprising:
   receiving destination capabilities from at least one destination component to an intermediate services component;
   parsing the received destination information to obtain a feature set, the feature set describing selected features available from the destination components;
   generating an aggregate capabilities ticket based on the received destination capabilities;
   providing the generated aggregate capabilities ticket from the intermediate services component to a client component; and
   receiving an aggregate intent ticket to the intermediate services component from the client component, the aggregate intent ticket produced by the client component based on the aggregate capabilities ticket.

2. The method of claim 1, further comprising compiling a destination component database.

3. The method of claim 1, further comprising:
   generating a destination intent ticket based on the received aggregate intent ticket; and
   providing the destination intent ticket to a target destination component.

4. The method of claim 3, further comprising compiling a destination component database and wherein generating the destination intent ticket comprises generating the destination intent ticket based on the received aggregate intent ticket and the destination component database.

5. The method of claim 1, wherein receiving destination capabilities from at least one destination component to an intermediate services component comprises:
   polling at least one destination component for the destination capabilities with the intermediate services component; and
   communicating with the at least one destination component when the at least one destination component is operational and possesses at least one destination capabilities.

6. The method of claim 1, wherein generating the aggregate capabilities ticket based on the received destination information comprises:
   excluding duplicate features from the feature set;
   determining at least one option associated with the features of the feature set;
   merging the options associated with the feature set to produce an options set; and
   merging the feature set and the options set to produce the aggregate capabilities ticket.

7. The method of claim 1, wherein the destination component is selected from the group consisting of: a printer, a multifunction printer/scanner, a plotter, a scanner, a computing services component, an email server, a web hosting component, a fileserver, a document management system, and a facsimile machine.

8. A network configured to provide resource management, comprising:
   a communication bus;
   at least one client device;
   at least one destination device;
   at least one processor; and
   at least one computer readable memory device which is readable by the processor, the computer readable memory device including a series of computer executable steps configured to cause the processor to:
      receive destination capabilities from at least one destination device to an intermediate services component;
      parse the received destination information to obtain a feature set, the feature set describing selected features available from the destination device and excluding duplicate features;
      generate an aggregate capabilities ticket based on the received destination capabilities;
      provide the generated aggregate capabilities ticket from the intermediate services component to a client device; and
      receive an aggregate intent ticket to the intermediate services component from the client device, the aggregate intent ticket produced by the client device based on the aggregate capabilities ticket.

9. The network of claim 8, wherein the processor is co-located within the client device.

10. The network of claim 8, further comprising a series of computer executable steps configured to cause the processor to compile a destination device database.

11. The network of claim 8, further comprising a series of computer executable steps configured to cause the processor to:
   generate a destination intent ticket based on the received aggregate intent ticket; and
   provide the destination intent ticket to a target destination device.

12. The network of claim 11, further comprising a series of computer executable steps configured to cause the processor to compile a destination device database and wherein the series of computer executable steps configured to cause the processor to generate the destination intent ticket comprises a series of computer executable steps configured to cause the processor to generate a destination intent ticket based on the received aggregate intent ticket and the destination device database.

13. The network of claim 8, wherein the computer executable steps configured to cause the processor to receive destination capabilities from at least one destination device to an intermediate services component comprise a series of computer executable steps configured to cause the processor to:
   poll at least one destination device with the intermediate services component for the destination capabilities; and
   communicate with the at least one destination device when the at least one destination device is operational and possesses at least one destination capabilities.

14. The network of claim 8, wherein the computer executable steps configured to cause the processor to generate the aggregate capabilities ticket based on the received destination capabilities comprise a series of computer executable steps configured to cause the processor to:
   determine at least one option associated with the features of the feature set;
   merge the options associated with the feature set to produce an options set; and
   merge the feature set and the options set to produce the aggregate capabilities ticket.

15. The network of claim 8, wherein the destination device is selected from the group consisting of: a printer, a multifunction printer/scanner, a plotter, a scanner, a computing services component, an email server, a web hosting component, a fileserver, a document management system, and a facsimile machine.

16. The network of claim 8, wherein the intermediate services component is a software server component.

17. A computer readable hardware medium storing a computer program executable by a processor to manage resources within a network, comprising:
   computer readable code to direct the reception of destination capabilities from at least one destination component to an intermediate services component;
   computer readable code to generate an aggregate capabilities ticket based on the received destination capabilities;
   computer readable code to provide the generated aggregate capabilities ticket from the intermediate services component to a client component;
   computer readable code to parse the destination capabilities to obtain a feature set, the feature set describing selected features available from the at least one destination component; and
   computer readable code to direct the reception of an aggregate intent ticket to the intermediate services component from the client component, the aggregate intent ticket produced by the client component based on the aggregate capabilities ticket.

18. The computer readable medium of claim 17, further comprising computer readable code to compile a destination component database.

19. The computer readable medium of claim 17, further comprising:
   computer readable code to generate a destination intent ticket based on the received aggregate intent ticket; and
   computer readable code to provide the destination intent ticket to a target destination component.

20. The computer readable medium of claim 19, further comprising computer readable code to compile a destination component database and wherein the computer readable code to generate the destination intent ticket comprises computer readable code to generate the destination intent ticket based on the received aggregate intent ticket and the destination component database.

21. The computer readable medium of claim 19, wherein the computer readable code to generate the aggregate capabilities ticket based on the received destination information comprises:
   computer readable code to parse the received destination information to obtain a feature set, the feature set describing selected features available from the destination component and excluding duplicate features;
   computer readable code to determine at least one option associated with the features of the feature set;
   computer readable code to merge the options associated with the feature set to produce an options set; and
   computer readable code to merge the feature set and the options set to produce the aggregate capabilities ticket.

22. The computer readable medium of claim 17, wherein the computer readable code to direct the reception of destination capabilities from at least one destination component to an intermediate services component comprises:
   computer readable code to poll at least one destination component for the destination capabilities with the intermediate services component; and
   computer readable code to communicate with the at least one destination component when the at least one destination component is operational and possesses at least one destination capabilities.

23. The computer readable medium of claim 17, wherein the destination component is selected from the group consisting of: a printer, a multifunction printer/scanner, a plotter, a scanner, a computing services component, an email server, a web hosting component, a fileserver, a document management system, and a facsimile machine.

24. The computer readable medium of claim 17, wherein the intermediate services component is a server.

25. A system for managing resources within a network, comprising:
   an intermediate services component configured to receive destination capabilities from at least one destination component;
   the intermediate services component configured to parse the destination capabilities to obtain a feature set, the feature set describing selected features available from the at least one destination component; and
   the intermediate services component configured to generate an aggregate capabilities ticket based on the received destination capabilities;
   the intermediate services component configured to provide the generated aggregate capabilities ticket to a client component;
   the intermediate services component configured to receive an aggregate intent ticket from the client component, the aggregate intent ticket produced by the client component based on the aggregate capabilities ticket.

26. The system of claim 25, further comprising means for compiling a destination component database.

27. The system of claim 25, further comprising:
   means for generating a destination intent ticket based on the received aggregate intent ticket; and
   means for providing the destination intent ticket to a target destination component.

28. The system of claim 27, further comprising means for compiling a destination component database and wherein the means for generating the destination intent ticket comprises means for generating the destination intent ticket based on the received aggregate intent ticket and the destination component database.

* * * * *